United States Patent [19]
Limperis et al.

[11] Patent Number: 5,744,238
[45] Date of Patent: Apr. 28, 1998

[54] DIMENSIONALLY STABLE SHEET HANDLING SHAFT ASSEMBLY AND METHOD OF MAKING SAME

[75] Inventors: Stephen Limperis; JoAnne M. Hallett, both of Rochester, N.Y.

[73] Assignee: Xerox Corporation, Stamford, Conn.

[21] Appl. No.: 537,952

[22] Filed: Oct. 2, 1995

[51] Int. Cl.[6] ............................................ B32B 25/00
[52] U.S. Cl. .................... 428/411.1; 428/35.8; 428/36.8; 428/36.9; 428/457; 428/480; 428/500; 428/521; 428/523; 464/181; 464/183; 492/28; 492/38; 492/39; 492/56
[58] Field of Search ...................... 492/28, 35, 38, 492/39, 56; 428/35.7, 35.8, 36.8, 36.9, 36.91, 411.1, 457, 480, 500, 521, 523, 906; 464/181, 183

[56] References Cited

U.S. PATENT DOCUMENTS

| | | |
|---|---|---|
| 4,104,210 | 8/1978 | Coran et al. ............................ 525/232 |
| 4,130,535 | 12/1978 | Coran et al. |
| 4,568,275 | 2/1986 | Sakurai . |
| 5,120,609 | 6/1992 | Blaszak et al. ............................ 428/446 |
| 5,378,526 | 1/1995 | Murata . |
| 5,439,416 | 8/1995 | Jaskowiak ............................ 464/181 |
| 5,538,475 | 7/1996 | Jaskowiak ............................ 464/181 |

*Primary Examiner*—Marie Yamnitzky
*Attorney, Agent, or Firm*—Tallam I. Nguti

[57] ABSTRACT

A shaft assembly having desirably stable dimensions for forming a precise sheet drive nip in a sheet handling machine such as a reproduction machine. The shaft assembly includes a shaft member having an outer surface, and a sheet drive-effecting member formed on the outer surface of their shaft member. The sheet drive-effecting member consists essentially of a first dimensionally stable molded material and has desired external dimensions. Importantly, the drive-effecting member has a thermoplastic elastomeric (TPE) material layer formed over the desired external dimensions for forming the precise sheet drive nip. The TPE material consists essentially of a thermoplastic vulcanizate (TPV) including a vulcanized rubber phase and a plastic material phase.

6 Claims, 4 Drawing Sheets

DIMENSIONALLY STABLE SHEET HANDLING SHAFT ASSEMBLY AND METHOD OF MAKING SAME

BACKGROUND OF THE INVENTION

This invention relates generally to sheet handling machines such as electrostatographic reproduction machines for producing copies of original images on sheets of support material. More particularly, the invention concerns a dimensionally stable sheet handling shaft assembly for use in such machines, and a method for making such a shaft.

Generally, electrostatographic reproduction machines employ a process that comprises initially charging a moving photoconductive member to a substantially uniform potential so as to sensitize the surface thereof. The charged portion of the photoconductive surface is exposed to a light image of the original document being reproduced. This records an electrostatic latent image on the photoconductive member which corresponds to the informational areas contained within the original document being reproduced. The latent image is developed by bringing a charged developer material into contact therewith. In this way, a powder image is formed on the photoconductive member which is subsequently transferred in timed and proper registration to a moving sheet of support material. When reproducing in the duplex mode, a sheet receiving a first image on one side, must be moved so as to also receive a second image in timed and proper registration on the other or duplex side thereof. The sheet of support material is then moved to a fusing apparatus where it is heated to permanently affix the powder image thereto.

The sheets of support material for supporting such reproduced images typically are moved and manipulated through the processing stations of such machines by various sheet feeders and handling devices that utilize sheet moving nips. The sheet moving nips usually are formed by at least a pair of driven rotatable shafts which contact and frictionally drive the sheets in the direction of their rotation. Typically, such shafts include "motion-effecting" devices (M-EDs) such as bearings, gears, and rollers, formed over at least a portion of the shaft. The assembly of such rollers, gears, and bearings accounts for a large part of the labor and cost of shaft assemblies in business machines, for example, in electrostatographic reproduction machines which move and use sheets of paper. The shaft assemblies usually require extraneous hardware to hold the "motion-effecting" devices or M-EDs. Such hardware ordinarily adds to the weight, cost, and time of assembly of each such shaft.

Conventionally, the M-EDs of such shafts have been made out of thermoset rubbers and elastomers, such as EPR's (ethylene-propylene rubbers). The use of such material to form M-EDs is disadvantageous because shaft assemblies including such M-EDs cost relatively more, the thermoset rubber material is not recyclable, and the M-EDs suffer ordinarily from dimensional instability which is exhibited, for example, as runout or an out-of-tolerance diameter.

Out-of-round or out-of-tolerance conditions resulting from dimensional instability, as such, are obviously undesirable in sheet handling apparatus. This is because for precise operations of many subsystems of a reproduction machine, sheet movement and sheet moving friction forces are carefully calculated based on sheet-to-M-ED surface contact areas. For example, such precision, and timing are critical for a properly registered image being transferred onto each side of a sheet of support material. In addition, thermoset rubber materials include crosslinks which inhibit desired material flow.

There is therefore a need for a sheet handling shaft assembly having a relatively lower cost and greater dimensional stability, and that includes M-EDs that are made at least in part from ordinarily recyclable material.

SUMMARY OF THE INVENTION

In accordance with one aspect of the present invention, there is provided a shaft assembly having desirably stable dimensions for forming a precise sheet drive nip in a sheet handling machine such as a reproduction machine. The shaft assembly includes a shaft member having an outer surface, and a sheet drive-effecting member formed on the outer surface of the shaft member. The sheet drive-effecting member consists essentially of a first dimensionally stable molded material and has desired external dimensions. Importantly, the drive-effecting member has a thermoplastic elastomeric (TPE) material layer formed over the desired external dimensions for forming the precise sheet drive nip. The TPE material consists essentially of a thermoplastic vulcanizate (TPV) including a vulcanized rubber phase and a plastic material phase.

Pursuant to another aspect of the present invention, there is provided a shaft assembly having desirably stable dimensions for forming a precise sheet drive nip in a sheet handling machine. The shaft assembly includes a tube member having an outer surface, a tube wall defining an interior, and at least a material flow perforation through the tube wall into the interior. The shaft assembly also includes a core member consisting essentially of a first molded material formed within the interior, and a sheet drive-effecting member formed on the outer surface of the tube member. The drive-effecting member has desired external dimensions, and is formed thus integrally with the core member, and therefore consists essentially of the first molded material. Importantly, the shaft assembly includes a thermoplastic elastomeric (TPE) material layer formed over the desired external dimensions of the sheet drive-effecting member for forming the precise sheet drive nip. The TPE material consists essentially of a thermoplastic vulcanizate (TPV) including a vulcanized rubber phase and in a plastic material phase.

Other features of the present invention will become apparent from the following drawings and description.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 6:
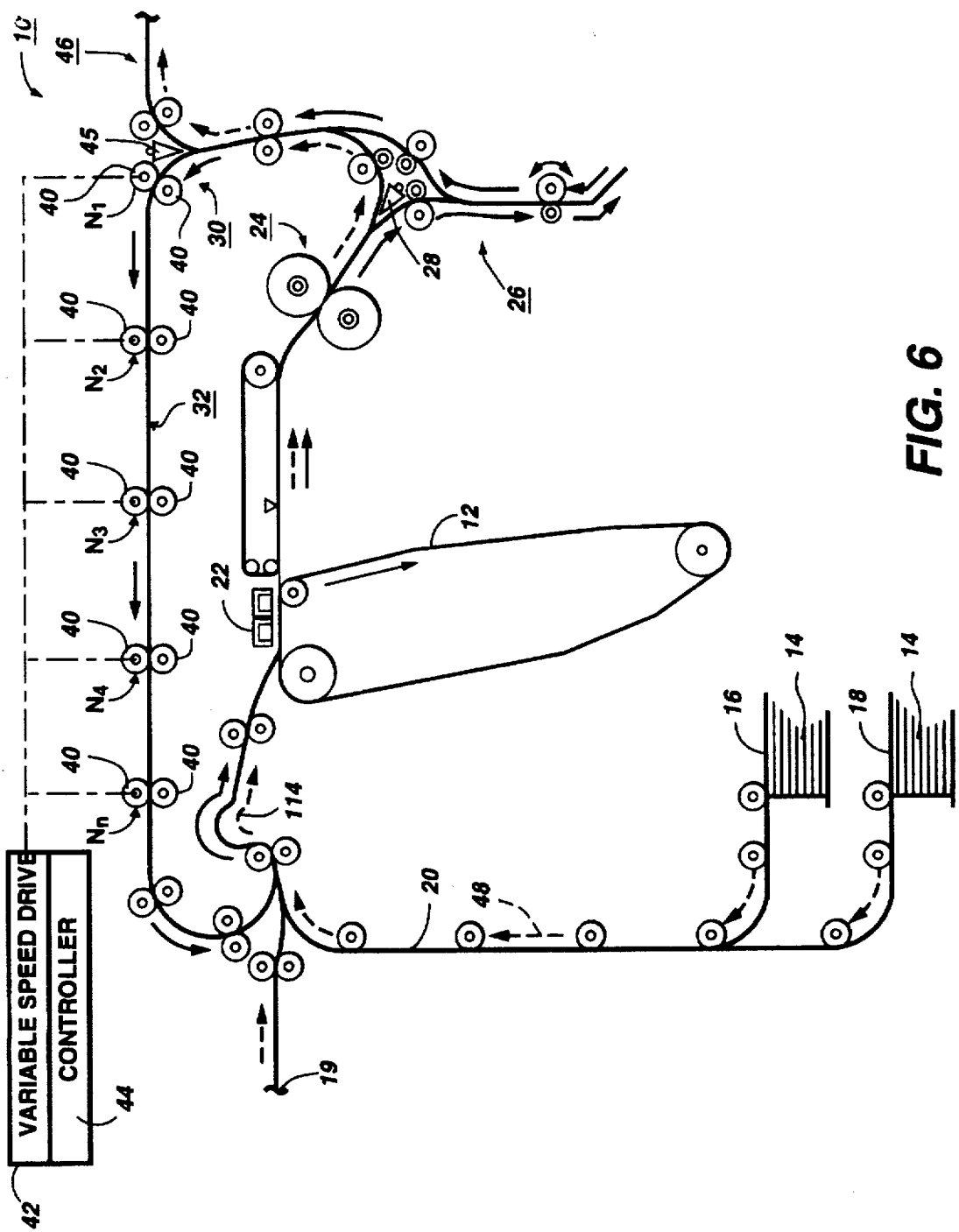
FIG. 6 is a schematic elevational view of an exemplary reproduction machine illustrating a variable speed endless loop duplex sheet handling path incorporating dimensionally stable sheet handling roller shafts in accordance with the present invention.

For a general understanding of the features of the present invention, reference is made to the drawings, in which like reference numerals have been used throughout to designate like elements. FIG. 6 schematically depicts various components of an illustrative electrostatographic reproduction machine incorporating the roller shaft assembly of the present invention. It will become evident from the following discussion that the roller shaft assembly is equally well suited for use in a wide variety of sheet handling machines and reproduction machines, and is not necessarily limited in its application to the particular embodiment shown herein. In addition, the location of the roller shaft assembly, as depicted in the FIG. 6 reproduction machine, may be varied. The roller shaft assembly may be positioned intermediate any of the processing stations within the reproduction machine. In the reproduction machine depicted in FIG. 6, a series of the roller shaft assemblies is used in a duplex sheet handling path of the machine. However, this location and particular use is merely illustrative of the operation of the roller shaft assembly and may be varied.

Describing first in further detail the exemplary reproduction machine embodiment with reference to FIG. 6, there is shown a duplex laser reproduction machine 10. Although the disclosed method and apparatus is particularly well adapted for use in such digital reproduction machines, it will be evident from the following description that it is not limited in application to any particular reproduction machine embodiment. While the machine 10 exemplified here is a xerographic laser reproduction machine, a wide variety of other printing systems with other types of reproducing schemes may equally utilize the disclosed dimensionally stable roller shaft assembly of the present invention.

Turning now more specifically to FIG. 6, there is illustrated the reproduction machine 10, a photoreceptor is 12, clean sheets 14 contained in paper trays 16 and 18 (with an optional high capacity input path 19), a vertical sheet input transport assembly is 20, image transfer apparatus 22, a fusing station 24, sheet inverting apparatus 26 selectable by a gate 28, a decurler 30, and the duplex sheet handling path 32 of the present invention. As shown, the duplex path 32 includes plural variable speed feeders $N_1\_N_n$ formed each by a pair of the dimensionally stable roller shaft assemblies 40 of the present invention. The feeders $N_1\_N_n$ comprise the majority of the length of the duplex path 32, and provide the duplex path sheet feeding action. The feeders are all driven by a variable speed drive 42 controlled by a controller 44. This is a top transfer (i.e. sheet face down) transport system. An additional gate 45 selects between a direct output path 46 and the dedicated duplex return path 32 of the present invention.

In FIG. 6, the endless loop duplex (second side) paper path 32 through which a sheet travels during duplex imaging is illustrated by the arrowed solid lines. On the other hand, a simplex sheet path 48 through which a sheet to be simplexed is imaged, is illustrated by the arrowed broken lines. Note, however, that the output path 46 and certain other parts of the duplex path 32 are shared by both duplex sheets and simplex sheets, as will be described. These paths are also shown with dashed-line arrows, as are the common input or "clean" sheet paths from the paper trays 16 or 18.

After a "clean" sheet is supplied from one of the regular paper feed trays 16 or 18 in FIG. 6, the sheet is conveyed by vertical transport 20 and a registration transport (not shown) past image transfer station 22 to receive an image from photoreceptor 12. The sheet then passes through fuser 24 where the image is permanently fixed or fused to the sheet. After passing through the fuser, a gate 28 either allows the sheet to move directly via output path 46 to a finisher or stacker (not shown), or deflects the sheet into the duplex path 32, specifically, first into single sheet inverter 26. That is, if the sheet is either a simplex sheet, or a completed duplex sheet having both side one and side two images formed thereon, the sheet will be conveyed via gate 28 directly to output path 46. However, if the sheet is being duplexed and is then only printed with a side one image, the gate 28 will be positioned by a sensor (e.g. led emitter and receiver) (not shown) and controller 44 to deflect that sheet into the inverter 26 of the duplex loop path 32, where that sheet will be inverted and then fed to sheet transport 20 for recirculation back through transfer station 22 and fuser 24. At the fuser 24,the side two image is permanently fixed to the backside of that duplex sheet, before it exits via exit path 46. All of the sheets pass through the decurler 30.

Proper functioning of each subsystem of the machine 10 as described above, as well as proper registration of an image transferred onto a sheet 14, particularly duplex images, require precise sheet movement timing and registration. In accordance with the present invention, such precise sheet movement timing and registration is achieved with sheet movement nips formed by the feeders $N_1\_N_n$ each consisting of a pair of the dimensionally stable roller shaft assemblies 40 of the present invention.

Figure 1:
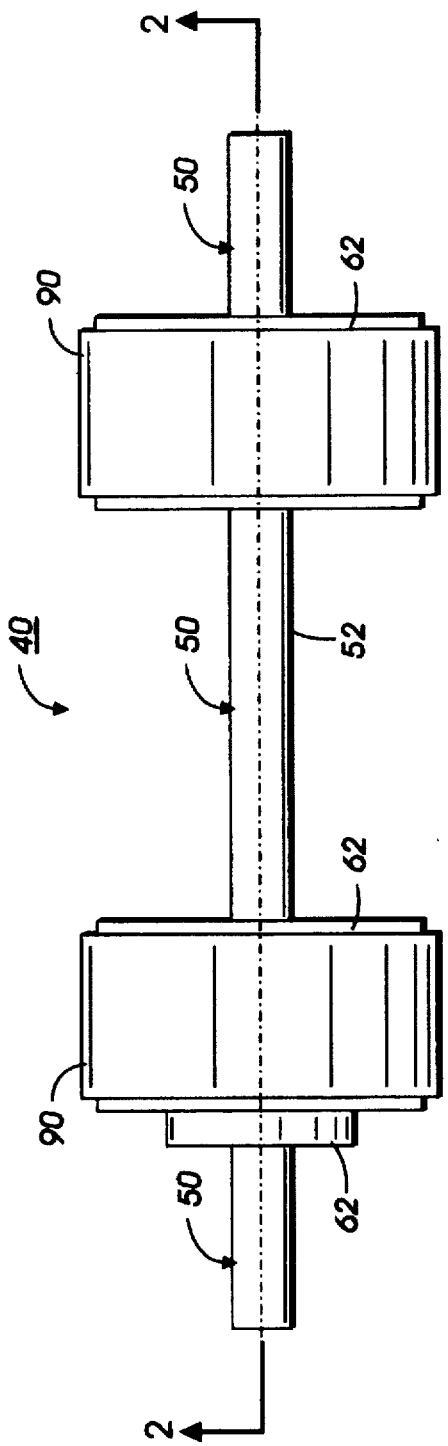
FIG. 1 is a side view of one embodiment of the dimensionally stable sheet handling roller shaft assembly of the present invention.
Figure 2:
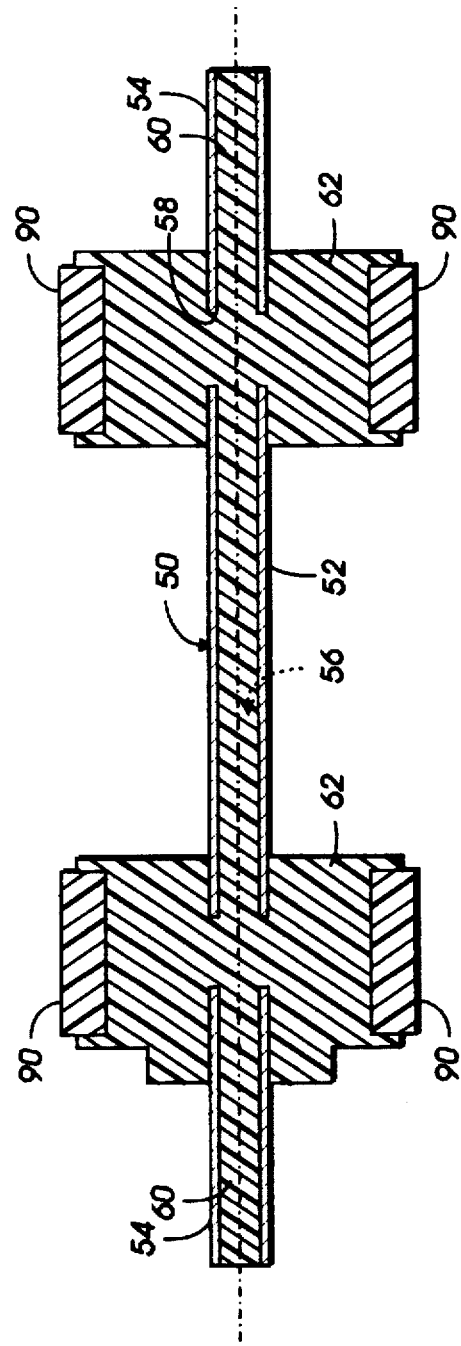
FIG. 2 is a longitudinal section of the roller shaft assembly of FIG. 1 showing its core and various layers.

Referring now to FIGS. 1 to 5, example embodiments of the dimensionally stable sheet handling shaft assemblies 40 of the present invention are illustrated. As shown in FIGS. 1 and 2, a first embodiment of the shaft assembly 40 comprises a tube member 50 that has an outer surface 52, and a tube wall 54 defining an interior 56. The tube member 50 includes at least a material flow perforation 58 through the tube wall 54 communicating with the interior 56. A core member 60 is formed, for example by injection molding within the interior 56. According to the present invention, the core member 60 consists essentially of a first moldable and dimensionally stable polymeric material such as any suitable thermoset or thermoplastic.

The first embodiment of the shaft assembly 40 importantly includes at least a motion-effecting device (M-ED) such as a sheet drive-effecting member 62 (two of which are shown), in the form of a roller, which is formed integrally with the core member 60 by the moldable material flowing from the interior 56 through the at least one perforation 58 onto the outer surface 52. The sheet drive-effecting member 62 therefore consists essentially of the same first moldable material as the core member 60, and has desired external dimensions (length and diameters) as determined by a sized-mold cavity during injection molding. The result is a compositely and partially assembled shaft comprising the tube member 50, core 60, and drive-effecting member 62. Assembling shafts compositely in this manner involves taking a hollow shaft or tube (with an interior defined by a tube wall) that has been cut to length and ground to size. Holes or perforations are formed, for example by laser burning, through the tube wall to provide gates through which the plastic will flow. The tube is then set in an injection mold that has been designed so that the laser burned holes line up with shaped cavities in the mold where corresponding motion-effecting devices such as a roller or gear is to be molded onto the outer surface of the tube. Plastic is then injected down the center of the tube and flows through the laser burned holes to fill the shaped cavities. The outcome is a compositely, partial, assembled shaft which requires few or no secondary finishing operations.

Figure 3:
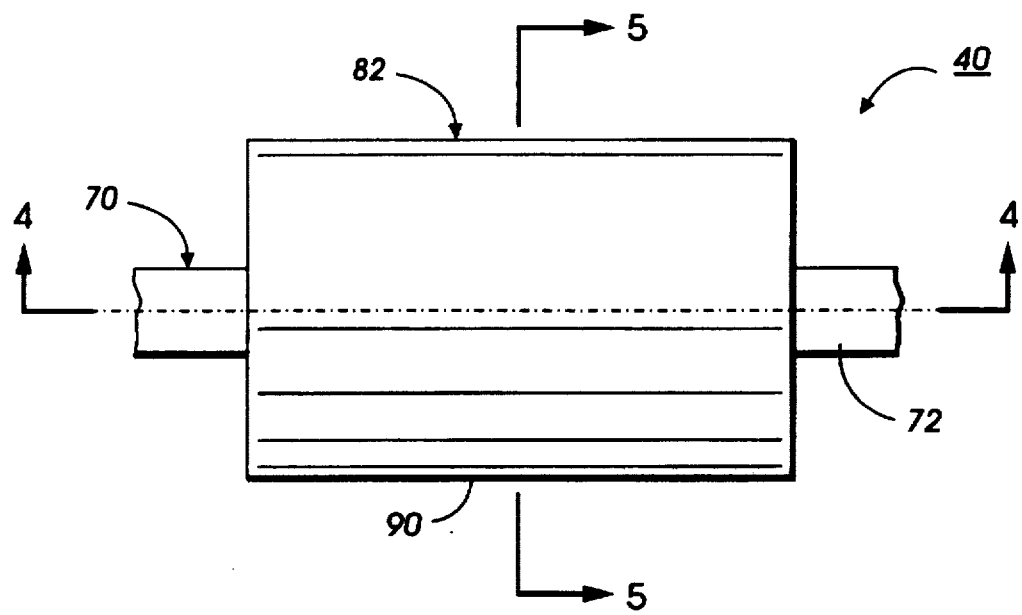
FIG. 3 is a side view of another embodiment of the dimensionally stable sheet handling roller shaft assembly of the present invention.
Figure 4:
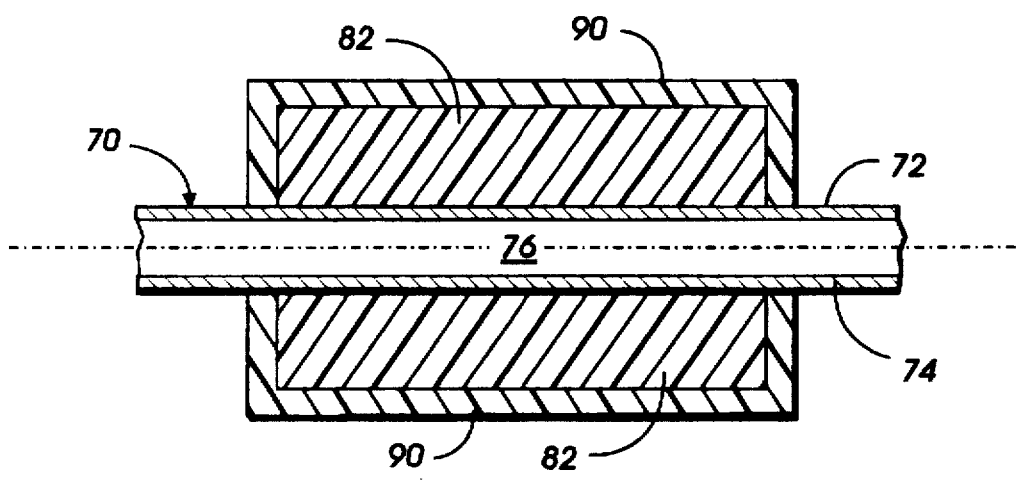
FIG. 4 is a longitudinal section of the roller shaft assembly of FIG. 3 showing its core and various layers.
Figure 5:
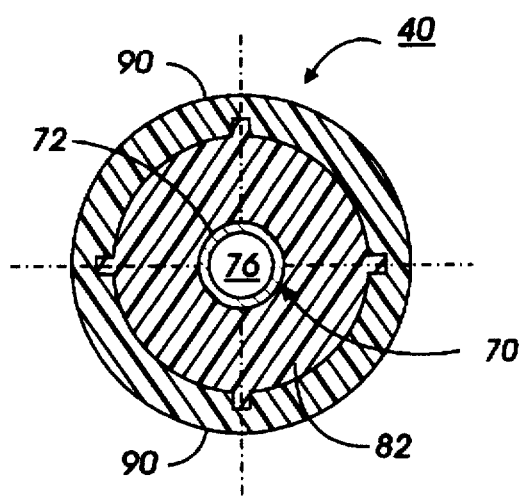
FIG. 5 is a cross-section of the roller shaft assembly of FIG. 3 showing its core and various layers.

As shown in FIGS. 3 to 5, a second embodiment of the shaft assembly 40 comprises a rigid shaft member 70 that has a knurled outer surface 72. The rigid shaft member 70 may be a tube member including a tube wall 74 defining an interior 76. The shaft member 70, if a tube member, does not have to include a material flow perforation as is the case in the first embodiment. According to this particular embodiment of the present invention, at least one motion-effecting device (M-ED) such as a sheet drive-effecting member 82, in the form of a single long roller, is formed by overmolding a dimensionally stable moldable elastomeric material onto the knurled outer surface 72 of the shaft member 70. The sheet drive-effecting member 82 has desired external dimensions (length and diameter) as determined by a sized-mold cavity during the overmolding operation. The result is an overmolded shaft that is a partial assembly comprising the shaft member 70, and drive-effecting member 82. This type of shaft assembly method involves, for example, molding the elastomer directly onto the knurled shaft This requires modifying the existing mold to accommodate the overmolded elastomer component. This can be done manually by changing the mold inserts or electronically by advancing the mold steel /inserts in the mold. The shaft materials are usually metallic such as stainless steel or carbon steel and the standard methods of shaft manufacturing are turning and centerless grinding. Secondary operations, such as plating, may be required when using carbon steel.

Referring now to FIGS. 1 to 5, the partially assembled shaft of each first and second embodiments importantly includes a thermoplastic elastomeric (TPE) layer 90, formed as by overmolding or injection molding over the desired external dimensions of each sheet drive-effecting member 62, 82 respectively. Rollers made from particular TPE material have been found to have desirable sheet handling characteristics such as hardness and coefficient of friction. Such rollers also have ozone and toner compatibility characteristics which are also very desirable when handling sheets in an electrostatographic reproduction machine. In addition, parts made from TPE material are recyclable, are faster to produce, and cost relatively less than similar parts made from thermoset rubber material.

There are about six categories or classifications of TPEs depending on particular material compositions. These categories include for example, Styrenic TPEs(TPE-1), Olefinic TPEs (TPE-2), Polyurethanes TPEs (TPE-3) (found to be too hard, thus resulting in a too low coefficient of friction), Polyamide TPEs (TPE-4), Copolyester TPEs (TPE-5) (found to be too hard, thus also resulting in too a low coefficient of friction), and Elastomeric Alloy TPEs (TPE-6). For the purposes of the present invention, high material cost and incompatibility with requirements of the electrostatographic process make styrenic (TPE-1) and polyamide TPEs (TPE-4) unsuitable for use in the shaft assembly 40. Olefinic TPEs were found to be too soft for the layer 90, thereby resulting in a very high coefficient of friction which tends to cause paper sheets to stick to the rollered of the shaft assembly.

Copolyester TPEs (TPE-5) are made up of random block copolymers that combine crystalline hard segments with soft segments to achieve excellent melt stability. An example of a hard segment is polybutylene terephthalate (PBT) and the soft segments are usually based on polyether glycols. A wide range of material grades can be created by varying the proportions of the hard and soft segments. In virgin form, these grades may offer 2 to 6 times the strength of thermoset rubbers. The flexible grades of copolyester elastomers are slightly stiffer than thermoset rubbers, while the rigid grades are as stiff as nylon (virgin form). When copolyester elastomers operate within their elastic limit, they are creep resistant and fatigue resistant. Fatigue resistance is affected by part size & shape, flexing frequency, temperature, and heat transfer to and from the part. Fatigue resistance is important to ensure that the shaft assembly can withstand repeated cycles before failure occurs. Copolyester elastomers are therefore suitable for applications that require tight tolerances and dimensional stability, such as those required for the sheet handling shaft assemblies 40 of the present invention.

Polyurethane elastomers (TPUs) (TPE-3) are on the high side of the thermoplastic elastomer spectrum in terms of price and performance. They are fully reacted structures formed by condensation polymerization. TPU structures are usually comprised of polyesters or polyethers. In rare instances, polycaprolactone, $C_6H_{10}O_{21}$ is used. The TPU structure determines its material properties. Two categories of TPUs exist, ester and ether TPUs. Ester TPUs are generally tougher but will hydrolyze and degrade when exposed to water. Ether TPUs do not hydrolyze or degrade when subjected to prolonged exposure to water and they offer better low temperature properties. Within each ether / ester category, there are two subcategories: aliphatic and aromatic. Aliphatics are highly resistant to ultraviolet radiation but are more expensive. Addition of stabilizers and absorbers can delay photo-oxidation in aromatics, but not to the same extent as in aliphatics.

The advantages to using TPUs include their outstanding abrasion resistance and tear strength. They are also noted for their toughness, and are well suited in applications that require a great degree of flexibility. The disadvantages of TPUs include being high priced in most applications and therefore, could prove to be costly to the user. TPUs may also require postannealing. This extra step in fabrication results in an increase in production time and part cost. Both categories of TPUs offer good resistance to hydrocarbons. Polyester blends are preferred in applications that require better ozone, oxygen, oil, and solvent resistance. Polyether blends have a better resistance to hydrolysis and microbial attacks, and are more capable of holding tight tolerances.

Elastomeric alloy TPEs (TPE-6) include thermoplastic vulcanizates (TPVs) which are a mixture comprised essentially of rubber and plastic in which the rubber phase is vulcanized to a great degree. The plastic phase is commonly a polyolefin, such as polypropylene —(C3H6)N—, and the rubber phase is most commonly an ethylene-propylene rubber.

Two distinguishable grades of TPVs exist. The grade that is preferred for the layer 90, of the shaft assembly 40 of the present invention, is made by blending ethylene propylene diene copolymer (EPDM) and polypropylene in a mixer. The material was mixed to a required degree of dispersion and vulcanizing agents were added to crosslink the EPDM before mixing was finished. The result was a fine dispersion of highly vulcanized EPDM rubber in a continuous phase of polypropylene. A process known as dynamic vulcanization stabilized the resulting mixture. Polypropylene EPDM TPVs as such are known for their comprehensive balance of mechanical and physical properties due to dynamic vulcanization.

For example, such TPVs are superior to thermoset rubbers in such properties as low temperature flexibility, creep resistance, elastic recovery, and coefficient of friction. They have a coefficient of friction that is greater than or equal to 1 which is desirable so that the rollers on the shaft assembly 40 can precisely grip the paper to feed it through the machine 10. However, an elastomer with a coefficient of friction greater than 1.45 may not be suitable. A high coefficient of friction is an indicator that the material is a softer grade. Softer materials have a tendency to wear away yielding a poor wear life. Coefficient of frictions less than 0.9 are not suitable and are an indicator of a harder material. Harder materials tend to polish smooth, thus lowering friction values. The fatigue resistance of TPVs is superior to most thermoset rubbers and their tear strength is competitive with thermoset rubbers of the same hardness range. It is important to determine if the particular TPE is compatible with alcohol based solvents. These solvents are often used to clean internal components of reproduction machines. TPVs also exhibit a low permeability to air and ozone. Specimens with carbon black additives offer better resistance to air aging than specimens of natural color.

The typical hardness range for TPE material rollers is 40 to 80 Shore A. For purposes of the present invention, a range from 50 to 75 Shore A is preferred. Elastomers with a hardness greater than 80 Shore A are more susceptible to contamination by paper lint and wear debris. This is due to the elastomer's resistance to deformation and its inability to embed particles. The material's inability to embed particles allows for the particles to adhere to the surface of the roller. This will facilitate a build up of contaminants on the roller. The contamination of the rollers will be passed on to the paper being fed in the machine, resulting in poor copy quality, such as deletions.

Additionally, the TPE material to be usable within a reproduction machine environment needs to be resistant to ozone. This is because exposure to ozone will deteriorate the polymer wherever a double bond may exist in the polymer chain. To prevent an elastomer from degrading in the presence of ozone, carbon black additives may be added. This ordinarily poses a problem for rollers that come into contact with paper since the carbon black will mark the paper as it is fed past the roller. Such marking occurs when carbon black additive migrates to the surface of the roller and bleeds off (surface blooms). This is one of the main reasons that TPEs have not been previously used in roller assemblies. According to an aspect of the present invention, it has been found that adding carbon blackat a % of less than 1%, prevents such paper marking.

Most elastomers are toner resistant but some polymer additives are not. If a compounded grade is to be used, it must be evaluated for toner resistance. The material will be approved as toner resistant if the toner does not block, cake, or become tacky. There can be no toner adherence to the part surface.

From a series of tests and evaluations, the preferred TPE material for the layer 90 of the shaft assembly 40 of the present invention is the thermoplastic vulcanizate (TPV) type TPE as described above. This material was tested in 3 different durometer values, 55 A, 64 A, and 73 A. These materials presented no processing difficulties and produced a high quality part. Because the TPVs did not require melt temperatures as high as other elastomers, they molded with lower cycle times. Cycle times ranged from 8 to 50 seconds for TPVs and were dependent on part weight and thickness. High viscosity at low shear rates permitted rapid, easy ejection of parts made from this material. The parts were cooled quickly such that they had a solidified skin and a molten core. Runouts measured were within a range of 0.05 mm to 0.15 mm. The overcoat layer design of the present invention is preferred because TPEs molded to required roller dimensions tend to result in substantially thick sections of TPE material which were found to be incapable ordinarily of holding tight tolerances. TPEs such as the preferred TPVs for the layer 90 are capable of holding specified runouts without post-grinding operations. Tight tolerances of course are a requirement for rollers forming precise sheet moving nips in a reproduction machine.

If injection molding the layer 90 using a larger cavity mold, it should be noted that since TPEs are elastic in nature, their viscosity is generally more affected by shear than by temperature. A low shear, high viscosity relationship results in rapid removal of molded parts from the mold because it enables excellent melt integrity and shape retention during cooling. A high shear, low viscosity relationship will result in rapid injection and shorter cycle times. As TPEs experience higher shear rates, the decrease in viscosity becomes greater. Reciprocating screw molding machines should be used whenever possible because shear rates can be better controlled.

Advantages to using this type of TPE material include the following. TPEs generally are furnished as production ready pellets like most thermoplastic resins. Compounding prior to processing is therefore not necessary as is the case with thermoset rubbers. TPEs have lower specific gravities than thermoset rubbers. This allows for more parts to be made per pound of material. The material cost factor drops with less weight per finished part. By assuming a TPE specific gravity of 1 g/cm3 and a thermoset specific gravity of 1.2 g/cm3, the material cost factor of a TPE is about $0.0033/cm3 versus $0.0035/cm3. This is based on a TPE cost per pound of $1.50 and a thermoset cost per pound of $1.30.

In recapitulation, the shaft assembly 40 of the present invention has desirably stable dimensions for forming a precise sheet drive nip in the machine 10. It is possible to utilize a black TPE in a paper feed shaft assembly without marking the paper. The percentage of carbon black added is controlled to less than or equal to 1 percent. TPEs such as the preferred TPVs for the layer 90 are capable of holding specified runouts without post- grinding operations.

It is apparent that there has been provided in accordance with the present invention, a dimensionally stable roller shaft assembly that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A shaft assembly having stable dimensions for forming a precise sheet drive nip in a sheet handling machine, the shaft assembly comprising:

(a) a shaft member having an outer surface;

(b) a sheet drive-effecting member formed on said outer surface of said shaft member, said sheet drive-effecting member consisting essentially of a first molded material and having desired external dimensions; and (c) an elastomeric alloy thermoplastic elastomer (TPE) material layer formed over said desired external dimensions of said sheet drive-effecting member for forming the precise sheet drive nip, said elastomeric alloy TPE material consisting essentially of a thermoplastic vulcanizate (TPV) including a plastic material phase and a vulcanized rubber phase said vulcanized rubber phase of said thermoplastic vulcanizate comprising an ethylene-propylene rubber.

2. The shaft assembly of claim 1, wherein for driving sheets effectively said elastomeric alloy TPE material layer has a coefficient of friction within a range of 1.00 to 1.45.

3. The shaft assembly of claim 2, wherein said elastomeric alloy TPE material layer has a hardness within a range from 50 to 75 Shore A.

4. The shaft assembly of claim 1, wherein said elastomeric alloy TPE material consists essentially of a blend of ethylene propylene diene copolymer (EPDM) and polypropylene.

5. A shaft assembly having stable dimensions for forming a precise sheet drive nip in a sheet handling machine, the shaft assembly comprising:

(a) a tube member having a tube wall defining an outer surface, an interior, and at least a perforation through said tube wall into said interior for moldable material flow;

(b) a core member formed within said interior, said core member consisting essentially of a first molded material;

(c) a sheet drive-effecting member formed integrally with said core member and on said outer surface of said tube member, said sheet drive-effecting member having desired external dimensions and consisting essentially of said first molded material; and (d) an elastomeric alloy thermoplastic elastomer (TPE) material layer formed over said desired external dimensions of said sheet drive-effecting member for forming the precise sheet drive nip, said elastomeric alloy TPE material consisting essentially of a thermoplastic vulcanizate (TPV) including a plastic material phase and a vulcanized rubber phase.

6. The shaft assembly of claim 5, wherein said elastomeric alloy TPE material layer includes a carbon black additive.

* * * * *